United States Patent
Mack et al.

(10) Patent No.: US 11,568,065 B2
(45) Date of Patent: Jan. 31, 2023

(54) SYSTEM FOR SECURING ELECTRONIC DATA BY AGGREGATION OF DISTRIBUTED ELECTRONIC DATABASE ENTRIES

(71) Applicant: BANK OF AMERICA CORPORATION, Charlotte, NC (US)

(72) Inventors: Nia Mack, Addison, TX (US); Brandon Sloane, Santa Barbara, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 178 days.

(21) Appl. No.: 17/149,878

(22) Filed: Jan. 15, 2021

(65) Prior Publication Data

US 2022/0229913 A1 Jul. 21, 2022

(51) Int. Cl.
| | |
|---|---|
| *H04L 29/06* | (2006.01) |
| *G06F 21/60* | (2013.01) |
| *G06F 16/27* | (2019.01) |
| *G06F 21/62* | (2013.01) |
| *G06F 16/22* | (2019.01) |
| *G06F 16/2455* | (2019.01) |

(52) U.S. Cl.
CPC ........ *G06F 21/602* (2013.01); *G06F 16/2255* (2019.01); *G06F 16/24556* (2019.01); *G06F 16/27* (2019.01); *G06F 21/6218* (2013.01)

(58) Field of Classification Search
CPC .. G06F 21/602; G06F 16/27; G06F 16/24556; G06F 16/2255; G06F 21/6218
See application file for complete search history.

(56) References Cited

U.S. PATENT DOCUMENTS

| | | | |
|---|---|---|---|
| 6,363,481 B1 * | 3/2002 | Hardjono | ............ G06F 21/6227 713/165 |
| 8,185,473 B2 | 5/2012 | Ginter et al. | |
| 8,200,700 B2 | 6/2012 | Moore et al. | |
| 8,423,565 B2 | 4/2013 | Redlich et al. | |
| 8,498,941 B2 | 7/2013 | Felsher | |
| 8,904,181 B1 | 12/2014 | Felsher et al. | |
| 9,129,133 B2 | 9/2015 | LaFever et al. | |
| 9,646,075 B2 | 5/2017 | Riggs | |
| 9,672,071 B2 | 6/2017 | Gerganov | |
| 9,734,169 B2 | 8/2017 | Redlich et al. | |

(Continued)

*Primary Examiner* — Shin-Hon (Eric) Chen
(74) *Attorney, Agent, or Firm* — Moore & Van Allen PLLC; Seongun M. Hong

(57) ABSTRACT

A system is provided for securing electronic data by aggregation of distributed electronic database entries. The system may comprise two or more data repositories that may be logically and/or physically separated from one another. Incoming data may be split into multiple parts that may be stored in a distributed manner across the two or more data repositories. Each of the parts of the incoming data may be associated with an identifier and/or a sequence number such that the system, upon receiving a user query for such data, may aggregate the individual parts of the data in the correct sequence. In some embodiments, the system may further use an obfuscation algorithm to apply randomized values to the identifiers and/or sequence numbers and track the operations performed in an obfuscation log. In this way, the system may provide a way to securely store and retrieve data to prevent unauthorized access.

14 Claims, 2 Drawing Sheets

(56) References Cited

U.S. PATENT DOCUMENTS

| | | | |
|---|---|---|---|
| 9,760,697 B1 | 9/2017 | Walker | |
| 10,103,893 B2 | 10/2018 | Kroonmaa et al. | |
| 10,191,996 B2 | 1/2019 | Rhoads et al. | |
| 10,216,580 B1* | 2/2019 | Peleg | G06F 16/116 |
| 10,326,769 B2 | 6/2019 | Ilieva et al. | |
| 10,430,263 B2 | 10/2019 | Polar Seminario | |
| 10,482,534 B2 | 11/2019 | Crowley et al. | |
| 10,572,684 B2 | 2/2020 | LaFever et al. | |
| 10,601,764 B2 | 3/2020 | LeVasseur et al. | |
| 10,607,027 B1* | 3/2020 | Ben Naim | G06F 21/64 |
| 10,818,385 B2 | 10/2020 | Raduchel | |
| 10,839,020 B2 | 11/2020 | Shah | |
| 11,138,232 B1* | 10/2021 | Paraschiv | G06F 16/254 |
| 2010/0058476 A1* | 3/2010 | Isoda | G06F 21/6227 |
| | | | 713/165 |
| 2017/0139991 A1* | 5/2017 | Teletia | G06F 16/9024 |
| 2019/0121902 A1* | 4/2019 | Ryan | G06F 16/278 |
| 2019/0208354 A1 | 7/2019 | Raduchel et al. | |
| 2020/0076578 A1* | 3/2020 | Ithal | G06F 21/6227 |
| 2020/0210484 A1* | 7/2020 | Shlyunkin | G06F 16/90328 |
| 2020/0272619 A1* | 8/2020 | Alferov | H04L 9/0643 |
| 2020/0301961 A1* | 9/2020 | Huang | G06F 16/583 |
| 2020/0402144 A1 | 12/2020 | Cook et al. | |
| 2021/0097075 A1* | 4/2021 | Zhang | G06F 11/2097 |
| 2021/0303633 A1* | 9/2021 | Irazabal | H04L 9/0643 |
| 2021/0334239 A1* | 10/2021 | Banister | G06F 16/258 |

* cited by examiner

SYSTEM FOR SECURING ELECTRONIC DATA BY AGGREGATION OF DISTRIBUTED ELECTRONIC DATABASE ENTRIES

FIELD OF THE INVENTION

The present disclosure embraces a system for securing electronic data by aggregation of distributed electronic database entries.

BACKGROUND

There is a need for a way to secure the privacy of stored electronic data from unauthorized access.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for securing electronic data by aggregation of distributed electronic database entries. In particular, the system may comprise two or more data repositories that may be logically and/or physically separated from one another. Incoming data may be split into multiple parts that may be stored in a distributed manner across the two or more data repositories. Each of the parts of the incoming data may be associated with an identifier and/or a sequence number such that the system, upon receiving a user query for such data, may aggregate the individual parts of the data in the correct sequence. In some embodiments, the system may further use an obfuscation algorithm to apply randomized values to the identifiers and/or sequence numbers and track the operations performed in an obfuscation log. The system may further use data chaffing processes to add further complexity to the distributed database system. In this way, the system may provide a way to securely store and retrieve data to prevent unauthorized access.

Accordingly, embodiments of the present disclosure provide a system for securing electronic data by aggregation of distributed electronic database entries, the system comprising a memory device with computer-readable program code stored thereon; a communication device; and a processing device operatively coupled to the memory device and the communication device, wherein the processing device is configured to execute the computer-readable program code to receive a request to store a set of data in a database; split the set of data into a plurality of data parts, wherein each of the plurality of data parts comprises a data identifier and a sequence identifier; store, in a distributed arrangement, the plurality of data parts in a plurality of databases; receive a query for the set of data; and based on the data identifier and the sequence identifier associated with each of the plurality of data parts, aggregate the plurality of data parts to reconstruct the set of data.

In some embodiments, the computer-readable program code, when executed, further causes the processing device to generate a plurality of chaff data parts corresponding to the plurality of data parts, wherein each of the plurality of chaff data parts comprises a chaff data identifier and a chaff sequence identifier; and store the plurality of chaff data parts with the plurality of data parts in the plurality of databases.

In some embodiments, aggregating the plurality of data parts comprises using a secret key to identify the plurality of data parts from the plurality of chaff data parts in the plurality of databases.

In some embodiments, the data identifier and the sequence identifier of each of the plurality of data parts are cryptographic hash values, wherein aggregating the plurality of data parts comprises identifying the plurality of data parts using a lookup table of hash values.

In some embodiments, splitting the set of data into the plurality of data parts further comprises algorithmically generating a randomization of the data identifier and the sequence identifier for each of the plurality of data parts; and storing the randomization in a sequence log.

In some embodiments, splitting the set of data into the plurality of data parts further comprises dynamically adjusting a number of divisions for the plurality of data parts.

In some embodiments, the plurality of data parts comprises at least one of a user name, user account number, and user location.

Embodiments of the present disclosure also provide a computer program product for securing electronic data by aggregation of distributed electronic database entries, the computer program product comprising at least one non-transitory computer readable medium having computer-readable program code portions embodied therein, the computer-readable program code portions comprising executable code portions for receiving a request to store a set of data in a database; splitting the set of data into a plurality of data parts, wherein each of the plurality of data parts comprises a data identifier and a sequence identifier; storing, in a distributed arrangement, the plurality of data parts in a plurality of databases; receiving a query for the set of data; and based on the data identifier and the sequence identifier associated with each of the plurality of data parts, aggregating the plurality of data parts to reconstruct the set of data.

In some embodiments, the computer-readable program code portions further comprise executable code portions for generating a plurality of chaff data parts corresponding to the plurality of data parts, wherein each of the plurality of chaff data parts comprises a chaff data identifier and a chaff sequence identifier; and storing the plurality of chaff data parts with the plurality of data parts in the plurality of databases.

In some embodiments, aggregating the plurality of data parts comprises using a secret key to identify the plurality of data parts from the plurality of chaff data parts in the plurality of databases.

In some embodiments, the data identifier and the sequence identifier of each of the plurality of data parts are cryptographic hash values, wherein aggregating the plurality of data parts comprises identifying the plurality of data parts using a lookup table of hash values.

In some embodiments, splitting the set of data into the plurality of data parts further comprises algorithmically generating a randomization of the data identifier and the sequence identifier for each of the plurality of data parts; and storing the randomization in a sequence log.

In some embodiments, splitting the set of data into the plurality of data parts further comprises dynamically adjusting a number of divisions for the plurality of data parts.

Embodiments of the present disclosure also provide a computer-implemented method for securing electronic data by aggregation of distributed electronic database entries, wherein the computer-implemented method comprises receiving a request to store a set of data in a database; splitting the set of data into a plurality of data parts, wherein each of the plurality of data parts comprises a data identifier and a sequence identifier; storing, in a distributed arrangement, the plurality of data parts in a plurality of databases; receiving a query for the set of data; and based on the data identifier and the sequence identifier associated with each of the plurality of data parts, aggregating the plurality of data parts to reconstruct the set of data.

In some embodiments, the computer-implemented method further comprises generating a plurality of chaff data parts corresponding to the plurality of data parts, wherein each of the plurality of chaff data parts comprises a chaff data identifier and a chaff sequence identifier; and storing the plurality of chaff data parts with the plurality of data parts in the plurality of databases.

In some embodiments, aggregating the plurality of data parts comprises using a secret key to identify the plurality of data parts from the plurality of chaff data parts in the plurality of databases.

In some embodiments, the data identifier and the sequence identifier of each of the plurality of data parts are cryptographic hash values, wherein aggregating the plurality of data parts comprises identifying the plurality of data parts using a lookup table of hash values.

In some embodiments, splitting the set of data into the plurality of data parts further comprises algorithmically generating a randomization of the data identifier and the sequence identifier for each of the plurality of data parts; and storing the randomization in a sequence log.

In some embodiments, splitting the set of data into the plurality of data parts further comprises dynamically adjusting a number of divisions for the plurality of data parts.

In some embodiments, the plurality of data parts comprises at least one of a user name, user account number, and user location.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
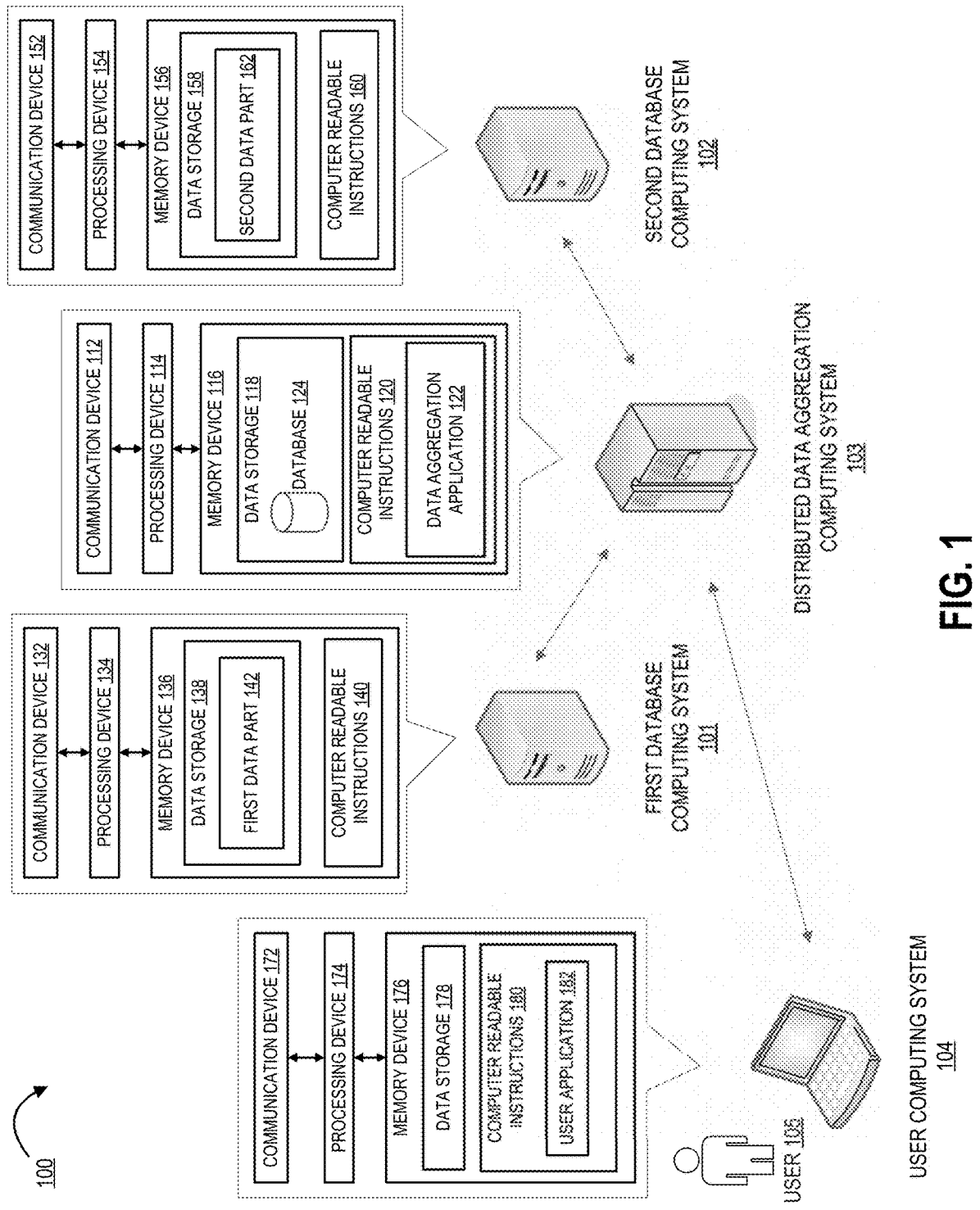
Figure 2:
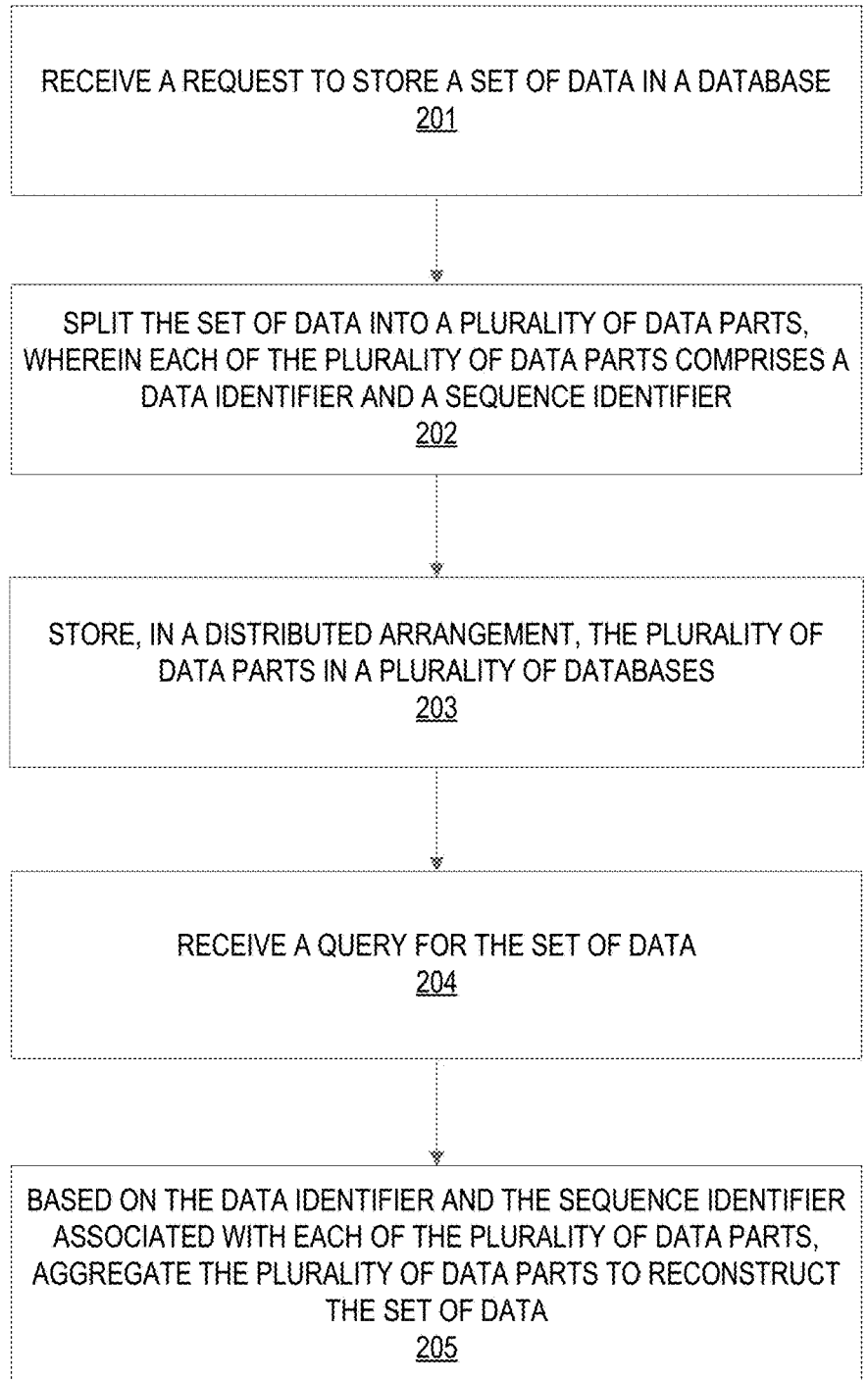

Having thus described embodiments of the invention in general terms, reference will now be made to the accompanying drawings, wherein:

FIG. 1 illustrates an operating environment for the distributed data aggregation system, in accordance with one embodiment of the present disclosure; and FIG. 2 illustrates a process flow for splitting and retrieving data using a distributed data aggregation system, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Data masking" or "data obfuscation" as used herein may refer to one or more processes to obscure the original or true value of data by modifying one or more aspects of the data. For instance, data obfuscation may be applied to a particular data field by adding, replacing, and/or removing one or more of the characters within the data field.

"Chaffing" as used herein may refer to one or more processes by which one or more filler data entries (which may be referred to herein as "chaff" or "chaff data") may be generated and associated with a data field or data set to be protected. The chaff data may have the same characteristics and/or formatting of the data to be protected such that the chaff data outwardly appears to be a valid data entry. For instance, a chaff user account number may be randomly generated by the system (e.g., using a random number generator). The chaff user account number may have the characteristics of a "true" account number (e.g., comprise one or more numerical characters of a fixed length) but may not correspond to or be associated with a real user. Accordingly, "winnowing" as used herein may refer to the identification of the true data among the chaff data using a secret key. By storing the true data along with the chaff, the system may hinder the ability of an unauthorized user to correctly identify the true data.

The system as described herein provides a way to mitigate the possibility of unauthorized access to sensitive or confidential data. In this regard, the system may comprise a plurality of databases that may be separated logically and/or physically from one another. Upon receiving a request to store a data record and/or data set (e.g., confidential data), the system may split the data into a plurality of data parts. Each of the plurality of data parts may then be stored in a distributed manner across the plurality of databases. Upon receiving a query for the data record and/or data set, the system may aggregate and reconstruct the data record and/or data set from their constituent data parts.

In some embodiments, each of the plurality of data parts may be modified (e.g., by data obfuscation) to comprise a data identifier and a sequence identifier. The data identifier as described herein may indicate to the system to which group of data a particular data part belongs, where the sequence identifier may indicate to the system the order in which a specific data part appears in the sequence of data records and/or data sets associated with a particular data identifier. Accordingly, the system may (e.g., upon receiving a query for the data) aggregate the plurality of data parts by grouping said data parts according to their data identifiers, then reconstruct the original data by appending the plurality of data parts to one another according to the order established by their sequence identifiers. In some embodiments, the data identifier and/or sequence identifier may be a numerical value. In other embodiments, the data identifier and/or sequence identifier may be a cryptographic hash value. In this regard, the system may be configured to apply algorithmic randomness (e.g., generate a randomization) to the data identifier and/or sequence identifier and maintain a log of such modifications to the data identifier and/or sequence identifier (which may be referred to herein as a "sequence log"). Based on the log, the system may be able to identify the correct data identifiers and/or sequence identifiers for a given data record or data set. In this way, the true values of the data identifiers and/or the sequence identifiers may be hidden from unauthorized users.

In some embodiments, the system may use chaffing to further obfuscate the true values of the confidential data. In such embodiments, the system may generate one or more chaff data parts concurrently with the plurality of data parts from the data record and/or data set to be protected. The chaff data parts may be stored and associated with each of the plurality of data parts (e.g., within the same table within the same database). In some embodiments, each of the chaff data parts may further comprise chaff data identifiers and/or chaff sequence identifiers. In such embodiments, the system may use a secret key to identify the true data parts from the chaff, aggregate the such data parts, and reconstruct the data according to the sequence numbers of the data parts.

An exemplary embodiment is provided below for illustrative purposes. In one embodiment, the system may receive a request to store data associated with a new user (e.g., user name and/or ID, user account number, user location, and the like). The data associated with the new user may be split into a plurality of parts to be stored on a plurality of separate databases. For instance, the user name may be stored on a first database, the user account number may be stored on a second database, and the user location may be stored on a third database. Each of the data parts may be associated with a data identifier which indicates that the data parts are to be grouped together. Continuing the example, the user name, user account number, and user location may each be associated with a data identifier (e.g., a character string, hash value, or the like). To illustrate, the user name, user account number, and user location may each be stored in their respective databases along with the data identifier. Each of the data parts may further be associated with a sequence number that identifies the sequence in which the data parts are to be reconstructed by the system. For example, the user name may be associated with a first sequence identifier (e.g., "1"), the user account number may be associated with a second sequence identifier (e.g., "2"), and the user location may be associated with a third sequence identifier (e.g., "3"). In other embodiments, a particular data entry within the data associated with the user may be split and distributed across multiple databases. For instance, the user name may be split and stored across a plurality of databases according to the processes described above.

Subsequently, the system may receive a query for the data associated with the user. By using the data identifiers associated with each of the data parts along with the sequence identifiers, the system may pull the data parts from each of the databases and reconstruct the data parts according to the sequence identifiers. For instance, if the query is for a user portrait associated with the user, the system may pull the user name, user account number, and user location from their respective databases and reconstruct the user portrait according to the sequence numbers of the data entries. In other embodiments, if the query is for a specific data entry associated with the user (e.g., a user account number associated with a user name specified in the search query), the system may pull the relevant data parts of the data entry (e.g., the user account number) from the plurality of databases and reconstruct the data entry using the sequence identifiers. In embodiments in which chaffing is used, the system may further use a secret key to identify the correct data identifiers and sequence identifiers associated with the data queried.

The system as described herein confers a number of technological advantages over conventional data security systems. In particular, by using the data splitting and aggregation schemes as described herein, the system may be able to hinder the ability of unauthorized users to gain access to sensitive data hosted in the network environment. Furthermore, by using the randomization and chaffing processes, the system may add multiple layers of security to the data storage and/or retrieval of data within the network, thereby further increasing the privacy and security of the sensitive data stored therein.

Turning now to the figures, FIG. 1 illustrates an operating environment 100 for the distributed data aggregation system, in accordance with one embodiment of the present disclosure. In particular, FIG. 1 illustrates a distributed data aggregation computing system 103 that is operatively coupled, via a network, to a first database computing system 101, second database computing system 102, and/or a user computing system 104. In such a configuration, the distributed data aggregation computing system 103 may transmit information to and/or receive information from the first database computing system 101, the second database computing system 102, and/or the user computing system 104.

It should be understood by one skilled in the art that FIG. 1 illustrates only an exemplary embodiment of the operating environment 100, and it will be appreciated that the operating environment 100 may comprise a fewer or greater number of computing systems and/or devices than are depicted in FIG. 1. For example, though the FIG. 1 depicts a first database computing system 101 and a second database computing system 102, some embodiments may include a fewer or greater number of database computing systems which may store split parts of data. It should also be understood that one or more functions of the systems, devices, or servers as depicted in FIG. 1 may be combined into a single system, device, or server. For instance, in some embodiments, the functions of the first database computing system 101 may be performed by the distributed data aggregation computing system 103. Furthermore, a single system, device, or server as depicted in FIG. 1 may represent multiple systems, devices, or servers. For instance, though the distributed data aggregation computing system 103 is depicted as a single unit, the functions of the distributed data aggregation computing system 103 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the distributed data aggregation computing system 103 may be a networked server, desktop computer, laptop computer, routing device, or other type of computing system within the network environment which performs the processes for splitting data, modifying data parts to include data identifiers and/or sequence identifiers, generating chaff data, aggregating data parts, and reconstructing the data, as described herein. Accordingly, the distributed data aggregation computing system 103 may comprise a processing device 114 operatively coupled to a communication device 112 and a memory device 116 having data storage 118 and computer readable instructions 120 stored thereon.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 114 may use the communication device 112 to communicate with the network and other devices on the network, such as, but not limited to the first database computing system 101 and/or the second database computing system 102. Accordingly, the communication device 112 generally comprises one or more hardware components such as a modem, antennae, Wi-Fi or Ethernet adapter, radio transceiver, or other device for communicating with other devices on the network.

In some embodiments, the memory device 116 includes data storage 118 for storing data related to the system environment. In this regard, the data storage 118 may comprise a database 124, which may be used to store information needed to perform the processes of the distributed data aggregation computing system 103 (e.g., secret keys to identify data parts, data splitting and/or aggregation logs, and the like). The memory device 116 may further have computer-readable instructions 120 stored thereon, where the computer-readable instructions 120 may comprise a data aggregation application 122, which may comprise computer-executable program code which may instruct the processing device 114 to perform certain logic, data processing, and data storing functions of the application to accomplish the entity's objectives. For instance, the data aggregation application 122 may receive queries and/or other data from the user computing system 104 (e.g., data to be stored within the system), split the incoming data into data parts and store the generated data parts on the first database computing system 101 and/or the second database computing system 102, retrieve and reconstruct the data from the data parts stored on the first database computing system 101 and/or the second database computing system 102, and perform the various masking and/or chaffing processes as described elsewhere herein.

As further illustrated in FIG. 1, the operating environment 100 may further comprise a first database computing system 101 in operative communication with the distributed data aggregation computing system 103. In particular, the first database computing system 101 may be a computing system that may store one or more data parts according to the splits determined by the distributed data aggregation computing system 103. Accordingly, the first database computing system 101 may be a computing system such as a server or networked terminal, though it is within the scope of the disclosure for the first database computing system 101 to be a device such as a desktop computer, laptop, IoT device, smartphone, tablet, single-board computer, or the like.

The first database computing system 101 may comprise a processing device 134 operatively coupled to a communication device 132 and a memory device 136 having data storage 138 and computer readable instructions 140 stored thereon. The data storage 138 may comprise a first data part 142, which may be a first portion or segment of a data record or data set that was split by the distributed data aggregation computing system 103. Accordingly, the first data part 142 may be retrieved by the distributed data aggregation computing system 103 and combined with other data parts (e.g., from different databases) to form a complete copy of the original data record and/or data set.

The operating environment 100 may further comprise a second database computing system 102 comprising a processing device 154 operatively coupled to a communication device 152 and a memory device 156 comprising data storage 158 and computer readable instructions 160. The data storage 158 of the second database computing system 102, similar to that of the first database computing system 101, may comprise a second data part 162, which may be a second portion or segment of a data record or data set that was split by the distributed data aggregation computing system 103. In this regard, the second data part 162 may be retrieved by the distributed data aggregation computing system 103 and combined with other data parts (e.g., the first data part 142 stored on the first database computing system 101) to form a complete copy of the original data record and/or data set (e.g., in response to a query from the user computing system 104).

In some embodiments, the operating environment 100 may further comprise a user computing system 104. The user computing system 104 may be a computing system that may submit requests to store data and/or queries to retrieve data to the distributed data aggregation computing system 103. In this regard, the user computing system 104 may be a computing system that is operated by a user 105, such as an administrator, agent, or employee of the entity. Accordingly, the user computing system 104 may be a computing system such as a desktop computer, laptop computer, smartphone or smart device, tablet, single board computer, or the like, though it is within the scope of the disclosure for the user computing system 104 to be any other kind of computing system as described herein (e.g., a "headless" computing system such as a server). The user computing system 104 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like) for interacting with the user 105.

The user computing system 104 may comprise a processing device 174 operatively coupled to a communication device 172 and a memory device 176, the memory device 176 comprising data storage 178 and computer readable instructions 180. The computer readable instructions 180 may comprise a user application 182, which in some embodiments may be an application with a graphical interface that may allow the user 105 to submit data storage requests to the distributed data aggregation computing system 103 and/or queries for data from the distributed data aggregation computing system 103. It should be understood that the data storage and/or retrieval process may appear seamless to the user 105 such that the user 105 may be unaware of the data splitting, aggregation, and/or reconstruction processes as performed by the distributed data aggregation computing system 103.

The communication devices as described herein may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random-Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for splitting and retrieving data using a distributed data aggregation system, in accordance with some embodiments of the present disclosure. The process begins at block 201, where the system receives a request to store a set of data. Said request may be received, for instance, from a user computing system. In an exemplary embodiment, the system may receive a request to store a set of confidential data (e.g., information associated with a new user). Accordingly, the set of data may comprise various types of information regarding the user, such as a user name, user account number, user location, user contact information, or the like. By using the process described herein, the system may provide a way to secure the privacy of the confidential data stored within the network environment.

The process continues to block 202, where the system splits the set of data into a plurality of data parts, wherein each of the plurality of data parts comprises a data identifier and a sequence identifier. In some embodiments, the system may split the set of data into a number of data parts depending on the data entries within the set of data. For instance, if the set of data contains four data entries (e.g., user name, user account number, user location, and user contact information), the system may split the set of data into four data parts. In other embodiments, each of the data entries may further be split into a number of data parts. The number of data parts to be generated may be selected by the system to balance computing efficiency and storage capabilities with the degree of security that is appropriate for the data to be protected. Accordingly, in some embodiments, the system may use an artificial intelligence-based process to assess the sensitivity of the data to be protected (e.g., a user account number may be considered more sensitive than user contact information) and generate a comparatively greater number of data parts for the data with higher sensitivity. In this way, the system may dynamically adjust the number of divisions (e.g., the number of data parts) for a given set of data.

The data identifiers for each of the data parts may indicate that said data parts are part of the same set of data. Accordingly, in some embodiments, each of the data entries within the set of data may comprise the same data identifier. In other embodiments, the data identifiers of each of the related data parts may have different values but be linked to one another in a log or lookup table maintained by the system. In such embodiments, the system may reference the log or lookup table to determine which data identifiers are related, such that the system may subsequently determine, based on the data identifiers, which data parts are related to one another.

The sequence identifiers for each of the data parts may indicate the order in which the data parts are to be combined to reconstruct the data set. Accordingly, in some embodiments, the sequence identifiers may be a sequence of numerical values (e.g., 1, 2, 3, and the like). In other embodiments, the sequence identifiers may be other types of values (e.g., character strings or hash values). In such embodiments, the log or lookup table maintained by the system may indicate the correct order of sequence identifiers for a given group of data parts.

In some embodiments, in addition to the plurality of data parts, the system may further generate a plurality of chaff data parts corresponding to the plurality of data parts. Each chaff data part may comprise values that facially appear to be valid versions of the data parts to which they correspond (e.g., chaff data values for account numbers may appear to be valid account numbers). Accordingly, each chaff data part may further comprise a chaff data identifier and/or chaff sequence identifier. In such an embodiment, the system may use a secret key (which may be stored within the log or lookup table) to identify the true values of the set of data.

The process continues to block 203, where the system stores, in a distributed arrangement, the plurality of data parts in a plurality of databases. The plurality of databases may be logically and/or physically separated from one another such that each of the plurality of databases may require a user and/or device to be authenticated and authorized to access each of the individual databases. Accordingly, the system may store the data parts across a number of databases depending on the number of data parts. For instance, continuing the above example, the system may store the four data parts in four distinct databases within the plurality of databases. By storing the data parts in separate databases, the system may reduce the effectiveness of inference-based attempts to gain unauthorized access to sensitive data.

The process continues to block 204, where the system receives a query for the set of data. In this regard, the query may be a request to pull a set of data stored within the plurality of databases. For instance, the query may be submitted from a user computing system to access certain information regarding the user (e.g., the user name, user account number, and the like associated with the user). Accordingly, based on the query, the system may perform a search (e.g., within the plurality of databases) for data having a data identifier associated with the requested data. By using the data identifiers, the system may determine the correct data parts needed to serve the user's query.

The process continues to block 205, where the system, based on the data identifier and the sequence identifier associated with each of the plurality of data parts, aggregates the plurality of data parts to reconstruct the set of data. Once the data parts have been identified using the data identifiers, the system may use the sequence identifiers of each of the data parts to reconstruct the set of data by appending the data parts in the sequence denoted by the sequence identifiers. For example, if the first data part has a sequence number of "1," and the second data part has a sequence number of "2," the second data part may be appended to the first data part. Once the set of data has been aggregated and reconstructed from the plurality of databases, the system may transmit the set of data to the user computing system. By using the data splitting and aggregation processes in this manner, the system may provide a way to secure sensitive data while creating a seamless user experience of interacting with a unitary logical database.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for securing electronic data by aggregation of distributed electronic database entries, the system comprising:
    a memory device with computer-readable program code stored thereon;
    a communication device; and
    a processing device operatively coupled to the memory device and the communication device, wherein the processing device is configured to execute the computer-readable program code to:
        receive a request to store a set of data in a database;
        split the set of data into a plurality of data parts, wherein each of the plurality of data parts comprises a data identifier and a sequence identifier;
        generate a plurality of chaff data parts corresponding to the plurality of data parts, wherein each of the plurality of chaff data parts comprises a chaff data identifier and a chaff sequence identifier;
        store, in a distributed arrangement, the plurality of data parts in a plurality of databases;
        store the plurality of chaff data parts with the plurality of data parts in the plurality of databases;
        receive a query for the set of data; and
        based on the data identifier and the sequence identifier associated with each of the plurality of data parts, aggregate the plurality of data parts to reconstruct the set of data, wherein aggregating the plurality of data parts comprises using a secret key to identify the plurality of data parts from the plurality of chaff data parts in the plurality of databases.

2. The system according to claim 1, wherein the data identifier and the sequence identifier of each of the plurality of data parts are cryptographic hash values, wherein aggregating the plurality of data parts comprises identifying the plurality of data parts using a lookup table of hash values.

3. The system according to claim 1, wherein splitting the set of data into the plurality of data parts further comprises:
    algorithmically generating a randomization of the data identifier and the sequence identifier for each of the plurality of data parts; and
    storing the randomization in a sequence log.

4. The system according to claim 1, wherein splitting the set of data into the plurality of data parts further comprises dynamically adjusting a number of divisions for the plurality of data parts.

5. The system according to claim 1, wherein the plurality of data parts comprises at least one of a user name, user account number, and user location.

6. A computer program product for securing electronic data by aggregation of distributed electronic database entries, the computer program product comprising at least one non-transitory computer readable medium having computer-readable program code portions embodied therein, the computer-readable program code portions comprising executable code portions for:
    receiving a request to store a set of data in a database;
    splitting the set of data into a plurality of data parts, wherein each of the plurality of data parts comprises a data identifier and a sequence identifier;
    generating a plurality of chaff data parts corresponding to the plurality of data parts, wherein each of the plurality of chaff data parts comprises a chaff data identifier and a chaff sequence identifier;
    storing, in a distributed arrangement, the plurality of data parts in a plurality of databases;
    storing the plurality of chaff data parts with the plurality of data parts in the plurality of databases;
    receiving a query for the set of data; and
    based on the data identifier and the sequence identifier associated with each of the plurality of data parts, aggregating the plurality of data parts to reconstruct the set of data, wherein aggregating the plurality of data parts comprises using a secret key to identify the plurality of data parts from the plurality of chaff data parts in the plurality of databases.

7. The computer program product according to claim 6, wherein the data identifier and the sequence identifier of each of the plurality of data parts are cryptographic hash values, wherein aggregating the plurality of data parts comprises identifying the plurality of data parts using a lookup table of hash values.

8. The computer program product according to claim 6, wherein splitting the set of data into the plurality of data parts further comprises:

algorithmically generating a randomization of the data identifier and the sequence identifier for each of the plurality of data parts; and storing the randomization in a sequence log.

9. The computer program product according to claim 6, wherein splitting the set of data into the plurality of data parts further comprises dynamically adjusting a number of divisions for the plurality of data parts.

10. A computer-implemented method for securing electronic data by aggregation of distributed electronic database entries, wherein the computer-implemented method comprises:

receiving a request to store a set of data in a database;

splitting the set of data into a plurality of data parts, wherein each of the plurality of data parts comprises a data identifier and a sequence identifier;

generating a plurality of chaff data parts corresponding to the plurality of data parts, wherein each of the plurality of chaff data parts comprises a chaff data identifier and a chaff sequence identifier;

storing, in a distributed arrangement, the plurality of data parts in a plurality of databases;

storing the plurality of chaff data parts with the plurality of data parts in the plurality of databases;

receiving a query for the set of data; and based on the data identifier and the sequence identifier associated with each of the plurality of data parts, aggregating the plurality of data parts to reconstruct the set of data, wherein aggregating the plurality of data parts comprises using a secret key to identify the plurality of data parts from the plurality of chaff data parts in the plurality of databases.

11. The computer-implemented method according to claim 10, wherein the data identifier and the sequence identifier of each of the plurality of data parts are cryptographic hash values, wherein aggregating the plurality of data parts comprises identifying the plurality of data parts using a lookup table of hash values.

12. The computer-implemented method according to claim 10, wherein splitting the set of data into the plurality of data parts further comprises:

algorithmically generating a randomization of the data identifier and the sequence identifier for each of the plurality of data parts; and storing the randomization in a sequence log.

13. The computer-implemented method according to claim 12, wherein splitting the set of data into the plurality of data parts further comprises dynamically adjusting a number of divisions for the plurality of data parts.

14. The computer-implemented method according to claim 10, wherein the plurality of data parts comprises at least one of a user name, user account number, and user location.

* * * * *